US009739243B2

(12) United States Patent
Kragh

(10) Patent No.: US 9,739,243 B2
(45) Date of Patent: Aug. 22, 2017

(54) METHODS AND SYSTEMS FOR FUEL VAPOR CONTROL

(75) Inventor: Niels Christopher Kragh, Commerce Township, MI (US)

(73) Assignee: Ford Gloabl Technologies, LLC, Dearborn, MI (US)

(*) Notice: Subject to any disclaimer, the term of this patent is extended or adjusted under 35 U.S.C. 154(b) by 857 days.

(21) Appl. No.: 13/371,218

(22) Filed: Feb. 10, 2012

(65) Prior Publication Data

US 2013/0206115 A1    Aug. 15, 2013

(51) Int. Cl.
*F02M 31/20* (2006.01)
*F02M 25/08* (2006.01)

(52) U.S. Cl.
CPC ..... F02M 31/20 (2013.01); *F02M 2025/0863* (2013.01); *Y02T 10/126* (2013.01)

(58) Field of Classification Search
CPC ............... Y02T 10/126; Y02T 10/166; B60K 15/03504; B60K 15/03514; B60K 15/04; F01P 7/16; F03M 31/18; F02M 37/20; F02M 31/20; F02M 1/165
USPC .... 123/516, 517, 518, 519, 520, 521, 41.25, 123/41.09; 165/51
See application file for complete search history.

(56) References Cited

U.S. PATENT DOCUMENTS

| | | | | |
|---|---|---|---|---|
| 2,390,979 A | * | 12/1945 | Young | F02M 1/00 123/522 |
| 2,472,622 A | * | 6/1949 | Savard | B64D 37/34 165/110 |
| 2,640,627 A | * | 6/1953 | Doelter | B64D 37/34 192/125 A |
| 2,748,758 A | * | 6/1956 | Fairbanks | F02M 31/10 123/552 |
| 3,783,849 A | * | 1/1974 | Bramfitt | F02M 13/06 123/179.16 |
| 3,913,345 A | * | 10/1975 | Goettl | F24F 1/022 261/106 |
| 3,926,000 A | * | 12/1975 | Scofield | B60H 1/00007 62/121 |
| 4,164,850 A | * | 8/1979 | Lowi, Jr. | B60H 1/00007 165/62 |
| 4,192,266 A | * | 3/1980 | Duckworth | F01P 3/18 123/555 |
| 4,263,786 A | * | 4/1981 | Eng | B64D 13/06 62/172 |
| 4,285,316 A | * | 8/1981 | Stolz | B60H 1/248 123/510 |

(Continued)

FOREIGN PATENT DOCUMENTS

DE    3214874 A1 * 11/1983    ............. F02M 31/20
DE    3214874 A1 * 11/1983    ............. F02M 31/20

(Continued)

*Primary Examiner* — Sizo Vilakazi
*Assistant Examiner* — Brian Kirby
(74) *Attorney, Agent, or Firm* — Julia Voutyras; McCoy Russell LLP

(57) ABSTRACT

Various methods and systems are provided for reducing pressure in a fuel tank of a fuel system of an engine. In one example, cooling fluid is routed from an air conditioner of a cooling system to a vapor cooler disposed in a vapor space of the fuel tank such that fuel vapor in the fuel tank may be condensed and routed to a fuel pump for delivery to the engine, thereby reducing a fuel tank pressure.

19 Claims, 5 Drawing Sheets

(56) References Cited

U.S. PATENT DOCUMENTS

| | | | | |
|---|---|---|---|---|
| 4,286,551 A | * | 9/1981 | Blitz | B60H 1/00492 123/142.5 E |
| 4,380,987 A | * | 4/1983 | Crain | F02D 33/006 123/514 |
| 4,413,594 A | * | 11/1983 | Hirota | F02B 1/02 123/1 A |
| 4,671,071 A | * | 6/1987 | Sasaki | B60K 15/03504 141/45 |
| 4,774,910 A | * | 10/1988 | Aihara | F01M 11/10 123/41.12 |
| 4,790,145 A | * | 12/1988 | Thompson | F02M 31/20 123/41.31 |
| 4,836,173 A | * | 6/1989 | Stires, Jr. | F02M 17/22 123/522 |
| 4,870,828 A | * | 10/1989 | Hidaka | B60K 15/00 123/514 |
| 4,911,110 A | * | 3/1990 | Isoda | F01P 3/20 123/142.5 R |
| 4,977,743 A | * | 12/1990 | Aihara | F01P 7/048 123/41.31 |
| 5,168,709 A | * | 12/1992 | Bombard | B01D 5/0039 220/749 |
| 5,215,044 A | * | 6/1993 | Banzhaf | F01P 3/20 123/41.05 |
| 5,251,588 A | * | 10/1993 | Tsujii | B60K 6/46 123/142.5 E |
| 5,255,735 A | * | 10/1993 | Raghava | B60K 15/03504 165/111 |
| 5,309,885 A | * | 5/1994 | Rawlings | F01P 3/12 123/184.21 |
| 5,366,150 A | * | 11/1994 | Kaimoto | B60H 1/00492 237/12.3 B |
| 5,415,196 A | * | 5/1995 | Bryant | B60K 15/03504 137/14 |
| 5,636,619 A | * | 6/1997 | Poola | B01D 53/22 123/585 |
| 5,647,331 A | * | 7/1997 | Swanson | F02M 37/10 123/509 |
| 5,649,517 A | * | 7/1997 | Poola | B01J 19/088 123/585 |
| 5,762,046 A | * | 6/1998 | Holmes | F02D 41/3082 123/497 |
| 5,765,511 A | * | 6/1998 | Schatz | B60H 1/00492 123/41.14 |
| 5,904,052 A | * | 5/1999 | Inoue | B60H 1/00007 165/43 |
| 5,957,113 A | * | 9/1999 | Masaki | F02M 25/089 123/518 |
| 5,964,204 A | * | 10/1999 | Freeland | B60K 15/035 123/516 |
| 6,067,489 A | * | 5/2000 | Letang | F01P 7/04 123/299 |
| 6,186,254 B1 | * | 2/2001 | Mufford | B60L 11/1885 180/165 |
| 6,230,692 B1 | * | 5/2001 | Thompson | B60K 15/00 123/516 |
| 6,438,945 B1 | * | 8/2002 | Takagi | F01N 3/0842 123/520 |
| 6,439,277 B1 | * | 8/2002 | Kyburz | B60K 15/03504 141/82 |
| 6,450,275 B1 | * | 9/2002 | Gabriel | B60K 6/22 165/41 |
| 6,457,460 B1 | * | 10/2002 | Doane | F02M 31/20 123/497 |
| 6,533,002 B1 | * | 3/2003 | Kobayashi | B60K 15/03504 141/198 |
| 6,761,190 B2 | * | 7/2004 | Nanaji | B67D 7/0478 141/198 |
| 6,840,219 B2 | * | 1/2005 | Joos | F01P 1/06 123/41.31 |
| 6,857,419 B1 | * | 2/2005 | Harvey | B01D 53/002 123/41.31 |
| 6,868,808 B2 | * | 3/2005 | Holder | F02M 33/02 123/3 |
| 6,957,542 B1 | | 10/2005 | Kido et al. | |
| 7,128,025 B1 | * | 10/2006 | Westhoff, Jr. | F01P 3/202 123/41.01 |
| 7,168,398 B2 | * | 1/2007 | Ap | F01P 7/165 123/41.1 |
| 7,398,771 B2 | * | 7/2008 | Theorell | F01N 3/2066 123/196 AB |
| 7,527,045 B2 | * | 5/2009 | Chung | F02M 31/20 123/519 |
| 7,827,972 B2 | * | 11/2010 | Makino | F02M 37/20 123/518 |
| 7,836,867 B2 | * | 11/2010 | Chyo | F02M 31/20 123/514 |
| 2001/0011539 A1 | * | 8/2001 | Ito | F02M 25/089 123/518 |
| 2002/0011221 A1 | * | 1/2002 | Suzuki | B60H 1/00492 123/41.14 |
| 2002/0185115 A1 | * | 12/2002 | Capshaw | F02M 37/20 123/518 |
| 2003/0145728 A1 | * | 8/2003 | Fuhling | B60K 15/03504 95/146 |
| 2005/0084723 A1 | * | 4/2005 | Mori | H01M 8/04029 429/413 |
| 2008/0250804 A1 | * | 10/2008 | Kubo | F17C 5/007 62/241 |
| 2008/0254939 A1 | * | 10/2008 | Ichimura | E02F 9/2246 477/107 |
| 2009/0038302 A1 | * | 2/2009 | Yamada | F01N 3/0205 60/320 |
| 2009/0049832 A1 | * | 2/2009 | Hase | F01N 5/02 60/320 |
| 2009/0139473 A1 | * | 6/2009 | McMillan | B60K 11/06 123/41.49 |
| 2010/0275607 A1 | * | 11/2010 | Allen | F02C 7/224 60/772 |
| 2011/0005477 A1 | * | 1/2011 | Terashima | F01K 23/065 123/41.51 |

FOREIGN PATENT DOCUMENTS

| | | | | |
|---|---|---|---|---|
| DE | 20019968 U1 | | 2/2001 | |
| GB | 2329218 A | | 3/1999 | |
| JP | S57200662 A | * | 12/1982 | F02M 31/20 |
| JP | S57200662 A | * | 12/1982 | F02M 31/20 |
| JP | 2000073899 A | * | 3/2000 | |
| JP | 2009275683 A | * | 11/2009 | |
| JP | 2009275683 A | * | 11/2009 | Y02T 10/123 |

* cited by examiner

METHODS AND SYSTEMS FOR FUEL VAPOR CONTROL

TECHNICAL FIELD

The present application relates to pressure control in fuel tanks in vehicles such as hybrid vehicles.

BACKGROUND AND SUMMARY

Reduced engine operation times in hybrid vehicles enable fuel economy and reduced regulated emissions benefits. However, the shorter engine operation times combined with low intake manifold vacuum may lead to insufficient purging of fuel vapor from a vapor canister coupled between the intake manifold and the fuel tank. Further, during conditions such as relatively warm ambient temperatures when fuel vapor generation in the fuel tank is increased, insufficient purging of the vapor canister may result in an increase in hydrocarbon emission to the atmosphere.

The inventors herein have recognized the above issue and have devised an approach to at least partly address it. In one example, a method for a fuel system is provided. The method includes, responsive to an operating condition, condensing fuel vapor in a vapor cooler disposed in a fuel tank and routing condensed fuel vapor to a fuel pump.

By condensing the fuel vapor within the fuel tank, a sealed fuel tank may be employed and fuel vapor purging to a vapor canister may be at least partially reduced. Further, fuel tank pressure control may be achieved even when a hybrid vehicle is operating with the engine off. Specifically, by using electronic air conditioning systems, fuel tank pressure can be controlled by vapor condensation in HEVs during engine-off times or before the engine is scheduled to start. The condensate or liquefied vapor that is collected during the engine-off time can then be injected into the fuel pump and or fuel line as soon as the engine is started. Further still, because the condensed fuel vapor is routed directly to the fuel pump and not to the fuel tank, fuel vapor generation in the tank can be reduced and the fuel can be directly supplied to the engine without recycling through the tank and corresponding components.

In a further embodiment, the vapor cooler may be in fluid communication with a cooling system of the vehicle other than the engine's coolant system, for example, via an air conditioner. As such, cooling system controls may be adjusted based on fuel tank parameters. For example, a radiator fan speed may be adjusted based on the temperature of the fuel tank. If the fuel tank temperature is relatively high and a heat transfer to the cooling fluid from the vapor cooler is relatively large, the radiator fan speed may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to various embodiments of methods and systems for controlling pressure in a fuel tank. In one example, a method for a fuel system comprises, responsive to an operating condition, condensing fuel vapor in a vapor cooler disposed in a fuel tank and routing condensed fuel vapor to a fuel pump or pressurized fuel line between the fuel pump and injectors. For example, the vapor cooler may be fluidly coupled to a cooling system such that heat exchange may occur between fuel vapors in the fuel tank and cooling fluid circulating through the vapor cooler. In this manner, fuel vapor in the fuel tank may be condensed such that a pressure in the fuel tank is decreased under conditions when the fuel tank pressure is high, such as under relatively high ambient temperatures. Further, in another embodiment, cooling system operation may be adjusted based on the fuel tank. Various examples will be described in greater detail herein.

Figure 1:
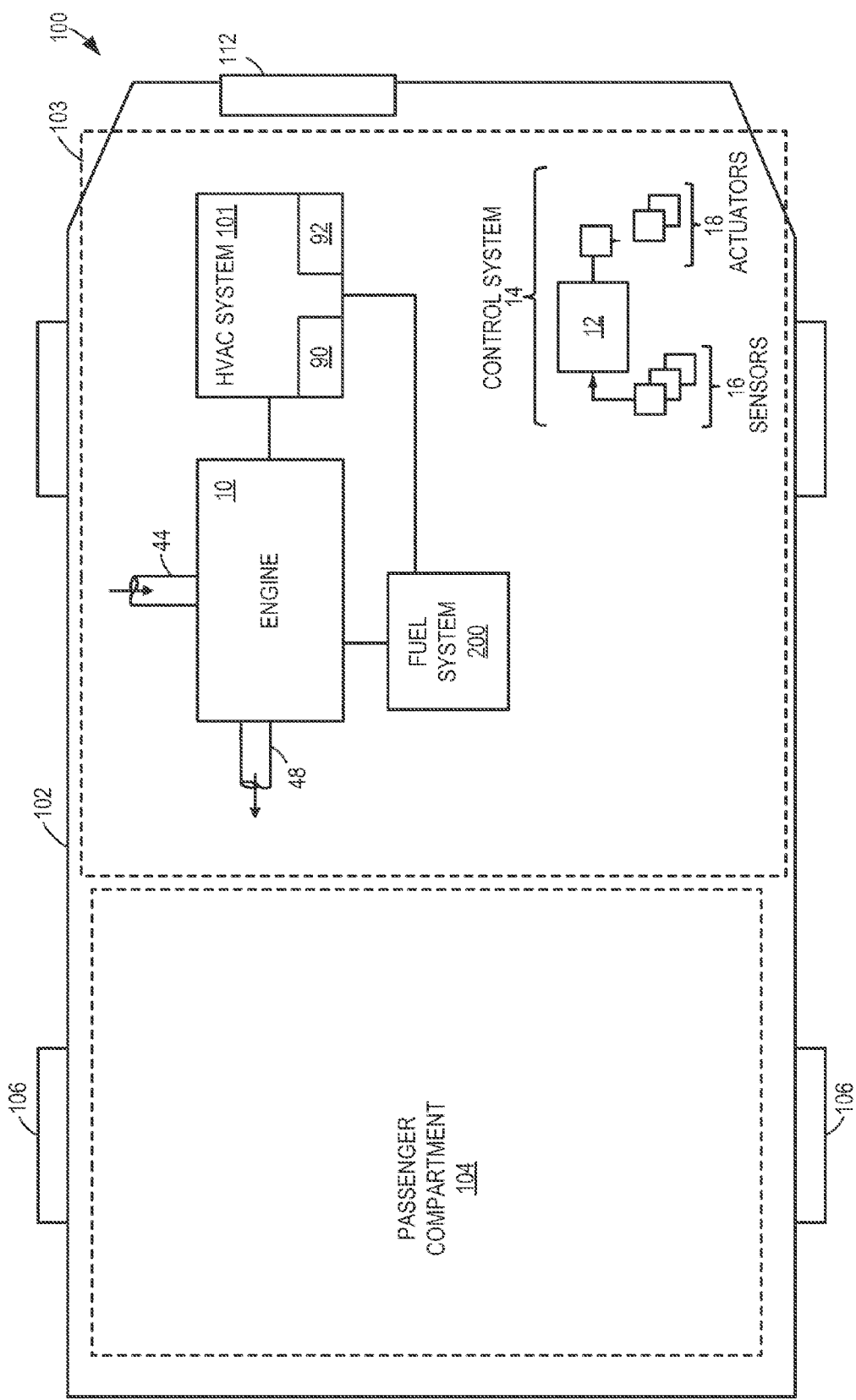
FIG. 1 schematically shows an example embodiment of a vehicle system which includes a cooling system.

FIG. 1 shows a schematic depiction an example embodiment of a hybrid vehicle system 100 that can derive propulsion power from engine 10 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

As illustrated schematically in FIG. 1, vehicle system 100 includes vehicle heating, ventilation and cooling (HVAC) system 101 (herein, also referred to as cooling system) in a motor vehicle 102. Vehicle 102 has drive wheels 106, a passenger compartment 104, and an under-hood compartment 103. Under-hood compartment 103 may house various under-hood components under the hood (not shown) of motor vehicle 102. For example, under-hood compartment 103 may house internal combustion engine 10. Internal combustion engine 10 has a combustion chamber which may receive intake air via intake passage 44 and may exhaust combustion gases via exhaust passage 48. In one example, intake passage 44 may be configured as a ram-air intake wherein the dynamic pressure created by moving vehicle 102 may be used to increase a static air pressure inside the engine's intake manifold. As such, this may allow a greater mass flow of air through the engine, thereby increasing engine power. Engine 10 as illustrated and described herein may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

HVAC system 101 includes air conditioner 90 and radiator 92. In addition, HVAC system 101 may include various pumps, valves, and heat exchangers for circulating an appropriate cooling fluid, such as water, coolant, or another suitable fluid, through internal combustion engine 10 to absorb waste heat. The waste heat may be used to heat passenger compartment 104 (e.g., when cabin heating is requested). Additionally, or optionally, the waste heat may be dissipated from the vehicle to ambient air, for example, by operating radiator 92.

One or more blowers (not shown) and cooling fans may be included in cooling system 101 to provide airflow assistance and augment a cooling airflow through the under-hood components. For example, a cooling fan coupled to radiator 92, may be operated when the vehicle is moving and the engine is running to provide cooling airflow assistance through radiator 92. The cooling fan may also draw a cooling airflow into under-hood compartment 103 through an opening in the front-end of vehicle 102, for example, through grill 112. Such a cooling air flow may then be utilized by radiator 92 and other under-hood components (e.g., fuel system components, batteries, etc.) to keep the engine and/or transmission cool. Further, in some examples, the air flow may be used to reject heat from air conditioner 90. Further still, additionally or alternatively, the airflow may be used to improve the performance of a turbocharged/supercharged engine that is equipped with intercoolers that reduce the temperature of the air that goes into the intake manifold/engine.

Further still, HVAC system 101 may include one or more auxiliary cooling devices (not shown) including a remote or stand alone thermal control system. When included, the auxiliary device (or stand alone system or remote thermal control system) may be located at the rear of the vehicle and may contain, as an example, a cooling pump or compressor, a condenser, cooling fan and lines connected to a vapor cooler inside a fuel tank of the vehicle's fuel system. The auxiliary or remote cooling system may be shared to cool other hardware, such as cooling a hybrid vehicles battery, or only used exclusively for cooling the fuel tank's vapor cooler.

Vehicle system 100 further includes fuel system 200 which supplies engine 10 with fuel for combustion. As will be described in greater detail with reference to FIG. 2 below, fuel system 200 includes a fuel tank with a vapor cooler disposed therein. The vapor cooler is in fluid communication with HVAC system 101, via air conditioner 90, for example. In such a configuration, the HVAC system may be adjusted based on components of the fuel system, such as the fuel tank. For example, when a temperature of the fuel tank is greater than a threshold temperature, a speed of the cooling fan may be increased to compensate for an increased cooling fluid temperature due to heat transfer from the vapor cooler.

Figure 2:
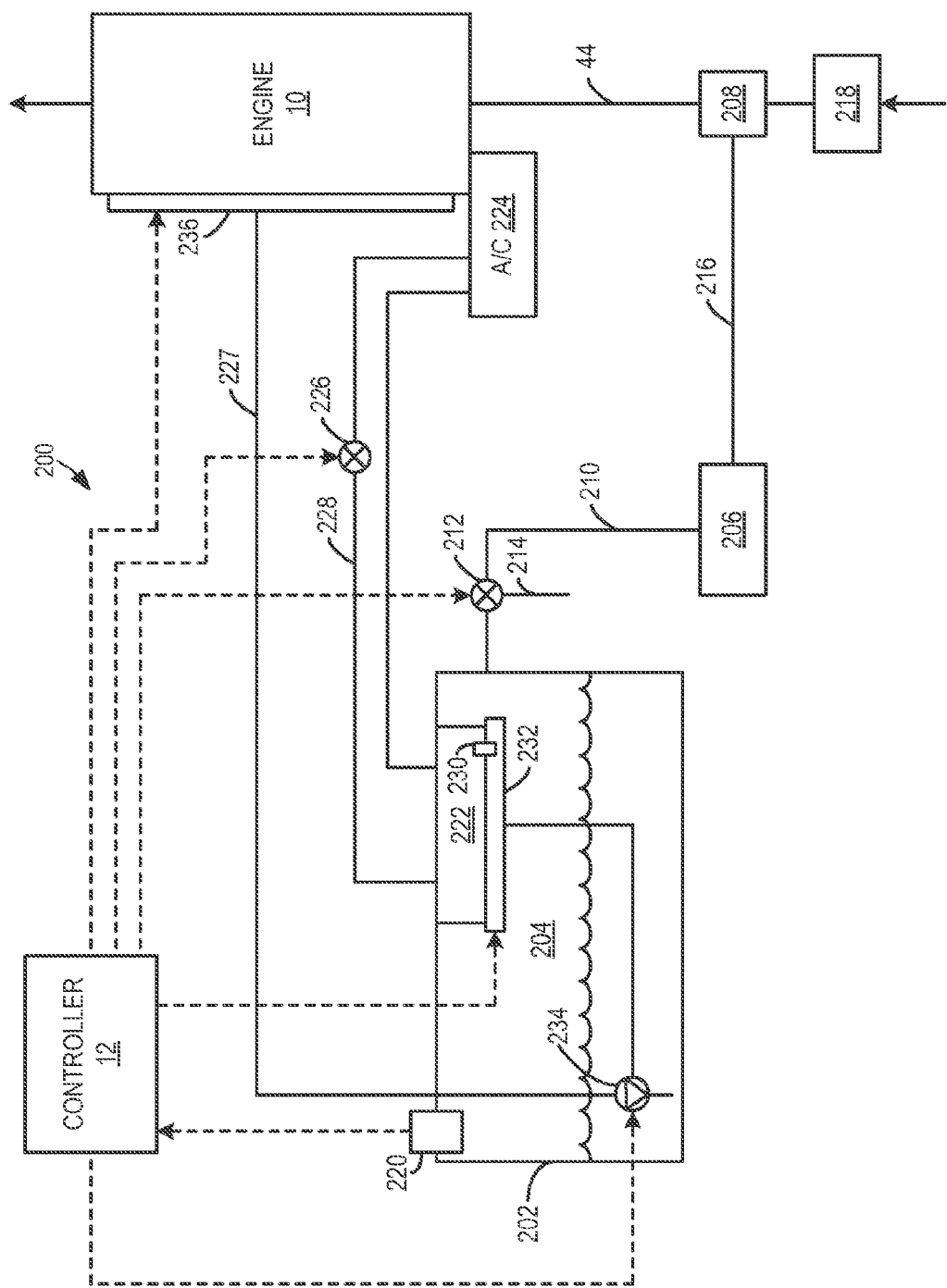
FIG. 2 shows an example embodiment of a fuel system.

As further elaborated in FIG. 2, during selected conditions, the air conditioner and/or or the auxiliary cooling devices of the HVAC system may be configured to remove heat or energies from the condensate vapor cooler in the fuel tank. In this way, air conditioning system or auxiliary cooling system may be used to cool the vapor cooler.

The example embodiment depicted in FIG. 1 further includes control system 14. Control system 14 may be communicatively coupled to various components of engine 10 to carry out the control routines and actions described herein. For example, as shown in FIG. 1, control system 14 includes an electronic digital controller 12. Controller 12 may be a microcomputer, including a microprocessor unit, input/output ports, an electronic storage medium for executable programs and calibration values, random access memory, keep alive memory, and a data bus. As depicted, controller 12 receives input from a plurality of sensors 16, which may include user inputs and/or sensors (such as transmission gear position, gas pedal input, brake input, transmission selector position, vehicle speed, engine speed, mass airflow through the engine, ambient temperature, intake air temperature, etc.), cooling system sensors (such as coolant temperature, fan speed, passenger compartment temperature, ambient humidity, etc.), and others. Further, controller 12 communicates with various actuators 18, which may include engine actuators (such as fuel injectors, an electronically controlled intake air throttle plate, spark plugs, etc.), cooling system actuators, and others. In some examples, the storage medium may be programmed with computer readable data representing instructions executable by the processor for performing the methods described below as well as other variants that are anticipated but not specifically listed.

FIG. 2 shows an example embodiment of fuel system 200. Fuel system 200 supplies engine 10 with fuel from fuel tank 202. Fuel tank 202 may hold a plurality of fuel blends, including fuel with a range of alcohol concentrations, such as various gasoline-ethanol blends, including E10, E85, gasoline, and combinations thereof. In other examples, fuel tank 202 may hold fuel such as diesel.

Fuel vapor may build-up in vapor space 204 of fuel tank 202 which may lead to an increase in pressure in fuel tank 202 and/or leakage of fuel vapor to the atmosphere. As such, fuel system 200 includes a fuel vapor recovery system which may include one or more fuel vapor recovery devices, such as one or more canisters filled with an appropriate adsorbent, such as canister 206, for temporarily trapping fuel vapor (including vaporized hydrocarbons) generated during fuel tank refueling operations, as well as diurnal vapors. In one example, the adsorbent used is activated charcoal. When purging conditions are met, such as when the canister is saturated, vapors stored in the fuel vapor recovery system may be purged to engine intake 44 where they are mixed with intake air filtered by air cleaner 218. In the example embodiment of FIG. 2, a flow of fuel vapor released from canister 206 may be regulated by canister purge valve 208 disposed in purge line 216. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake.

The fuel vapor recovery system further includes isolation valve 212. During regular engine operation, isolation valve 212 may be kept closed to limit the amount of diurnal vapors directed to canister 206 from fuel tank 202 via passage 210. During refueling operations, and selected purging conditions, isolation valve 212 may be temporarily opened, e.g., for a duration, to direct fuel vapor from the fuel tank to canister 206. While the example depicted in FIG. 2 shows isolation valve 212 positioned along passage 210, in alternate embodiments, the isolation valve may be mounted on fuel tank 20.

The fuel vapor recovery system may further include vent 214 which may route gases out of the fuel vapor recovery system to the atmosphere when storing, or trapping, fuel vapor from fuel tank 20. Vent 214 may also allow fresh air to be drawn into the fuel vapor recovery system when purging stored fuel vapor to engine intake 44 via purge line 216 and purge valve 208. A canister check valve (not shown) may be optionally included in purge line 216 to prevent (boosted) intake manifold pressure from flowing gases into the purge line in the reverse direction. While this example shows vent 214 communicating with fresh, unheated air, various modifications may also be used.

One or more sensors 220 may be coupled to fuel tank 202 for estimating various fuel tank parameters. For example, sensor 220 may be a pressure sensor which is configured to measure a fuel tank pressure and to communicate the fuel tank pressure or vacuum level to controller 12. As another example, sensor 220 may be a temperature sensor which is configured to measure a fuel tank temperature and to communicate the fuel tank temperature to controller 12.

As shown in FIG. 2, fuel system 200 further includes a vapor cooler 222 disposed in vapor space 204 of fuel tank 202. Vapor cooler 222 may be a suitable device for cooling air that passes through it, and thereby, condenses fuel vapor present in the air. For example, relatively cool cooling fluid may pass through an evaporator of vapor cooler 222 such that a heat exchange takes place within the vapor cooler. The cooling fluid may be water, refrigerant, or another suitable cooling fluid other than engine coolant. In one example, as depicted in FIG. 2, refrigerant may flow to vapor cooler 222 from air conditioner 224 which is part of a heating, cooling, and air conditioning (HVAC) system (such as HVAC system 101 of FIG. 1), as described above. In an alternate embodiment, the vapor cooler may be in (further) fluid communication with another auxiliary cooling device, such as a remote or stand alone cooling system. Further, valve 226 is included along cooling fluid line 228 such that a flow of cooling fluid from air conditioner 224 to vapor cooler 222 may be regulated by controller 12.

In such an embodiment, heat transfer from the vapor cooler to the cooling fluid may affect cooling system controls. For example, cooling fluid may be directed to flow through the vapor cooler during a cold engine start when a temperature in the fuel tank is greater than a threshold temperature, thereby reducing a time for the engine to warm up. As another example, a radiator fan may be turned on or off and/or a speed of the radiator fan may be adjusted based on a temperature of the fuel tank. For example, if cooling fluid is flowing to the vapor cooler and being warmed due to heat exchange with the vapor cooler when a temperature of the fuel tank is greater than a threshold temperature, the radiator fan speed may be increased. Likewise, if cooling fluid is flowing to the vapor cooler and the temperature of the fuel tank is less than a threshold temperature, the radiator fan speed may be decreased. Such examples will be described in greater detail below with reference to FIGS. 4 and 5.

Continuing with FIG. 2, when valve 226 is positioned such that cooling fluid flows to vapor cooler 222, air and fuel vapor in the vapor cooler may be cooled to a point where low boiling point hydrocarbons condense/liquefy. Vapor cooler 222 fills with fuel vapor from vapor space 204 in fuel tank 202 by equilibrium, thereby balancing air hydrocarbon concentration in the vapor cooler by partial pressure equilibrium. Further, as the fuel vapor condenses, due to the vapor to liquid phase change, a reduction in pressure in the vapor cooler pulls in more vapor from the vapor space, replacing some of the air in the vapor cooler. In this manner, pressure in vapor space 204 may be reduced due to a reduction of hydrocarbon mass concentration (e.g., fuel vapor) in vapor space 204. The condensed fuel vapor drains from the vapor cooler evaporator and collects at the bottom of the vapor cooler housing.

Liquid level sensor 230 is disposed in vapor cooler 222 such that a level of condensate in vapor cooler 222 may be detected. Based on the level of condensate detected by liquid level sensor 230, controller 12 may turn on liquid feed pump 232. Liquid feed pump 232 may pump the condensate from vapor cooler 222 to fuel pump 234. Alternatively, liquid feed pump 232 may pressurize the condensate and pump it directly into pressurized fuel line 227, wherefrom the condensate may be delivered to the fuel rail and injectors. As an example, liquid feed pump 232 may be turned on when there is a threshold level of condensate in vapor cooler 222. By pumping the condensate directly to fuel pump 234 or into pressurized fuel line 227, fuel tank 202 is bypassed and the condensate is not returned to the fuel tank 202. In some embodiments, the condensed fuel vapor may be pumped to the fuel pump under a first condition, pumped to the fuel line under a second condition, and pumped to the fuel tank under a third condition. For example, in a hybrid electric vehicle, the condensed fuel vapor may be pumped to the fuel pump during a first condition when the engine is operating and the fuel pump is operating. The condensed fuel vapor may be pumped to the fuel line during a second condition for storing the condensed fuel vapors in a liquid phase in the pressurized fuel line, for rapid delivery to the injectors. The condensed fuel vapor may be pumped to the fuel tank during a third condition when the engine is off and the vehicle is operating by battery. By pumping the condensed fuel vapor directly to the fuel pump and bypassing the fuel tank, it is possible to directly utilize the condensed fuel rather then recycling it back through the fuel tank and corresponding components where it may collect additional ambient heat (e.g., the condensed fuel bypasses the fuel tank in being delivered to the fuel pump or fuel line directly). Further, by condensing fuel vapor in the fuel tank, a reduced amount of fuel vapor may be purged to the vapor canister 206. In this manner, there is a reduced possibility of hydrocarbons leaking to the atmosphere.

Fuel pump 234 pressurizes the condensed fuel vapor, and/or fuel pumped from fuel tank 202 and routes the condensate and/or fuel to cylinders of engine 10 via pressurized fuel line 227. In the example shown in FIG. 2, fuel pump 234 routes the condensate and/or fuel along fuel line 227 to a fuel rail 236 which delivers the condensate and/or fuel to one or more fuel injectors of each cylinder of engine 10. Other embodiments may not include a fuel rail, and fuel pump 234 may deliver the condensate and/or fuel directly into fuel line 227, and into each of the injectors. It should be appreciated that fuel system 200 may be a return-less fuel system, a return fuel system, or various other types of fuel systems.

Thus, the fuel system includes a fuel tank with a vapor cooler disposed in a vapor space of the fuel tank. In one example, the vapor cooler is in fluid communication with an air conditioner and a cooling system of the engine. As such, cooling system controls may be adjusted based on a temperature and or pressure of the fuel tank and whether cooling fluid is flowing to the vapor cooler. Further, the vapor cooler condenses fuel vapor in the vapor space of the fuel tank such that a pressure in the fuel tank may be reduced. The condensed fuel vapor is pumped to a fuel pump or pressurized fuel line of the fuel tank such that it is routed directly to cylinders of the engine for combustion instead of being added to the fuel in the fuel tank. By not returning the vaporized lightens of hydrocarbon to the fuel tank's liquid reduces the amount of work that needs to be done by the fuel pump.

The fuel system of FIG. 2 also enables tank pressure control to be achieved over a larger duration of vehicle operation. Conventionally, fuel tank pressure control is accomplished by pulsing a valve positioned between the fuel tank and canister to slowly reduce tank pressure. However, in such fuel systems, tank pressure control via the pulsing cannot be enabled unless the engine is running with closed-loop air-fuel ratio control, and with canister purge flow requested. Even then the amount of tank pressure control is limited until the canister vapor concentration is sufficiently low and/or a sufficiently high purge air flow request is available. These factors, along with the time required for purge adaptive strategies to update, can limit the amount of time tank pressure control is actually available to reduce the tank pressure. In comparison, tank pressure control by condensation can be available more often. For example, by using an electronic cooling system, such as an electronically controlled air conditioning system, tank pressure can be controlled by vapor condensation when a hybrid vehicle is operating with the engine commanded off, as well as before the engine is scheduled to start. The condensate or liquefied vapor collected during the engine-off time can then be injected into the fuel pump and or fuel line as soon as the engine is started. Further, tank pressure control by condensation can utilize closed loop stoichiometry air-fuel ratio controls rather than slow purge adaptive strategies. Overall, greater amounts of tank pressure reduction are achieved and more time is available to control tank pressure.

Figure 3:
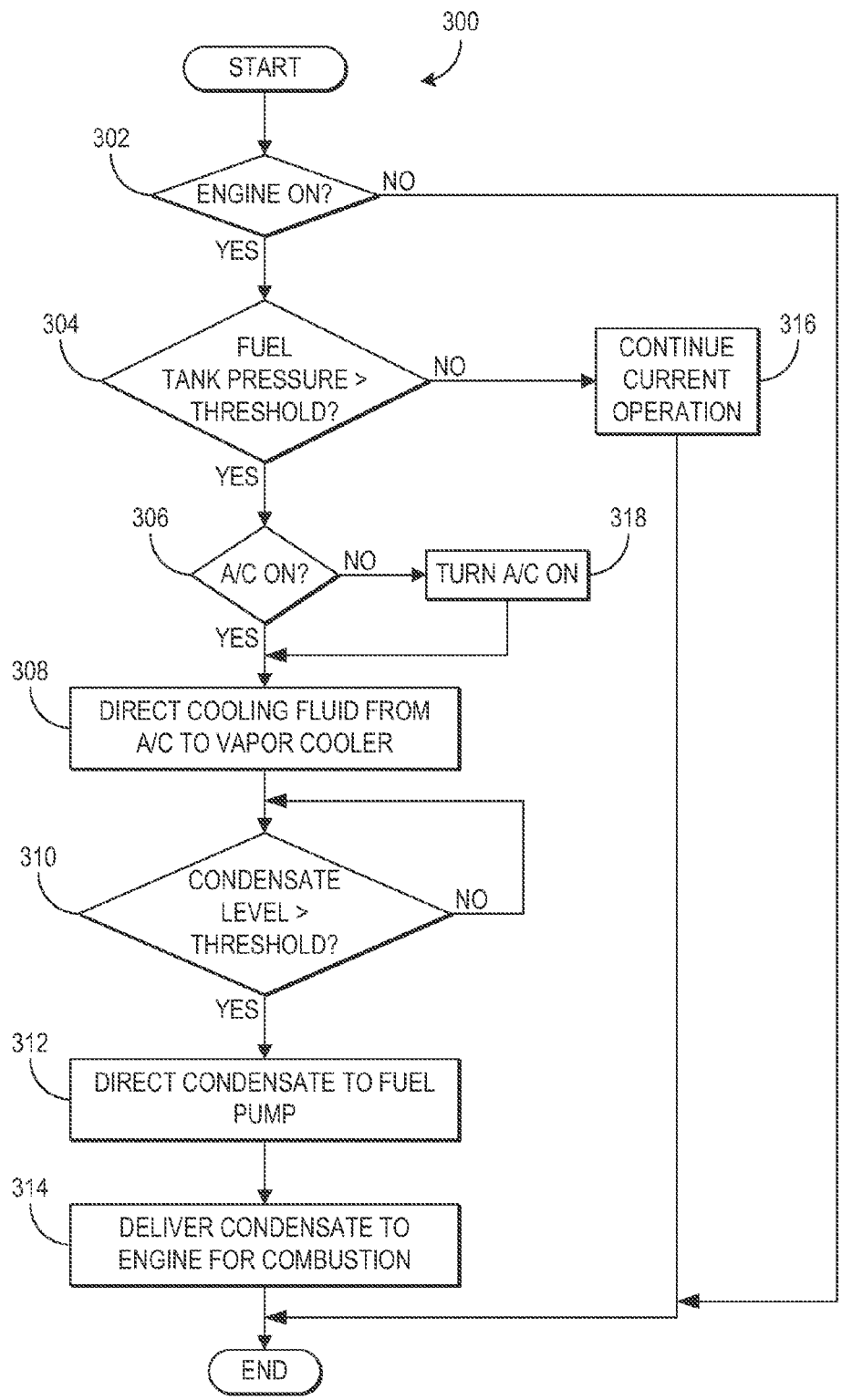
FIG. 3 shows a flow chart illustrating a routine for controlling pressure in a fuel tank.
Figure 4:
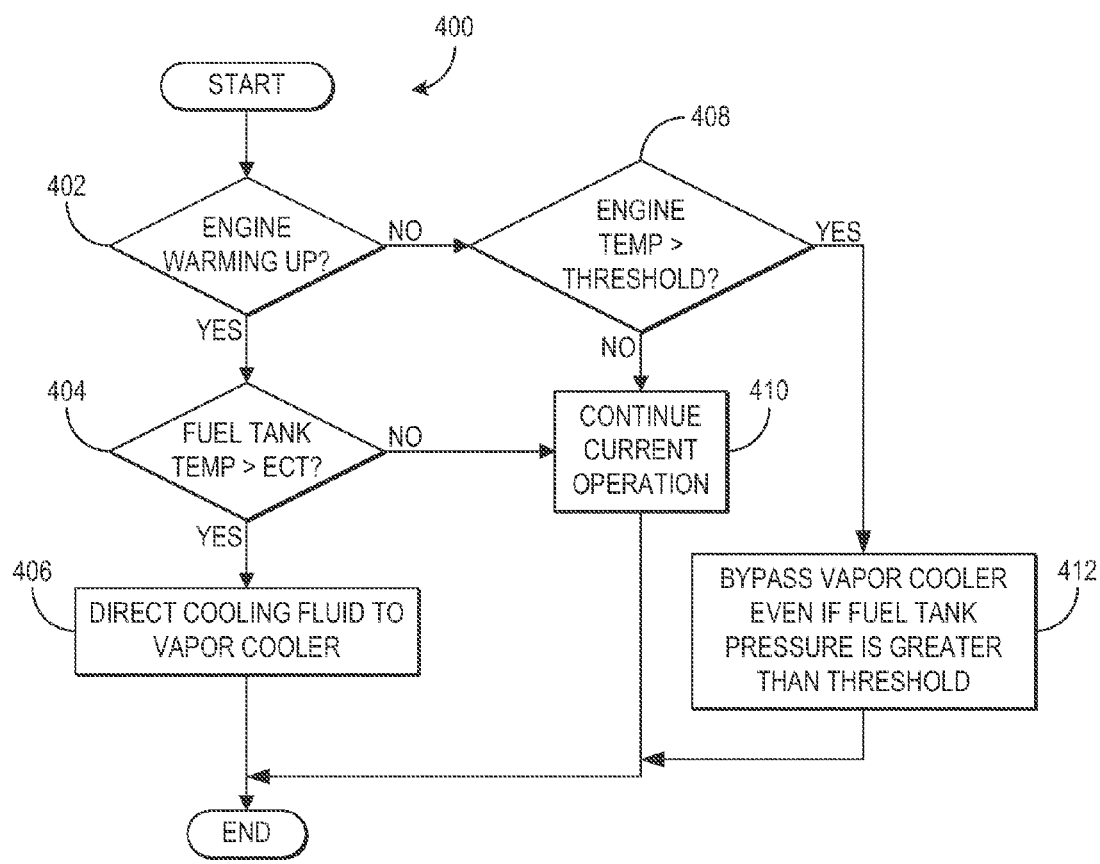
FIG. 4 shows a flow chart illustrating a routine for controlling cooling fluid flow to a vapor cooler based on an engine temperature.
Figure 5:
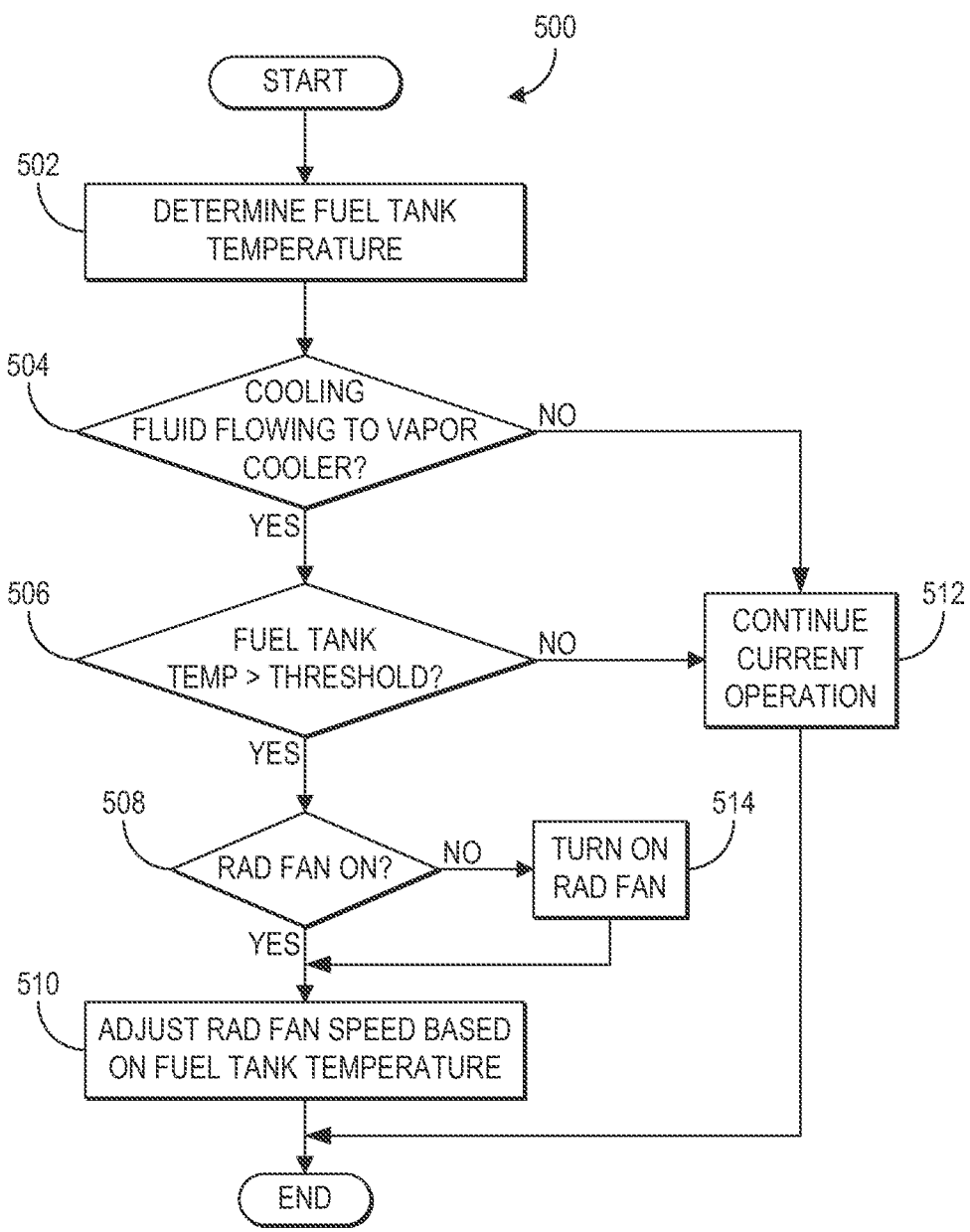
FIG. 5 shows a flow chart illustrating for controlling a radiator fan based on a fuel tank temperature.

FIGS. 3-5 show flow charts illustrating control routines for a vehicle system which includes a cooling system in fluid communication with a fuel system, such as vehicle system 100 which includes cooling system 101 and fuel system 200 described above with reference to FIGS. 1 and 2. For example, FIG. 3 shows a control routine for controlling pressure in a fuel tank by condensing fuel vapor in the fuel tank via a vapor cooler in fluid communication with the cooling system. The routine includes directing cooling fluid to flow to the vapor cooler under conditions in which the fuel tank pressure is greater than a threshold, such as during relatively warm ambient conditions. FIGS. 4 and 5 show routines for adjusting cooling system controls based on the fuel tank. For example, FIG. 4 shows a routine for directing or shutting off flow of cooling fluid to the vapor cooler based on an engine temperature and a fuel tank temperature (and/or pressure). Further, FIG. 5 shows a routine for adjusting operation of a radiator fan based on the temperature and/or pressure of the fuel tank. As will be described below, in some examples, the radiator fan may be turned on or a speed of the radiator fan may be adjusted responsive to the fuel tank temperature and/or pressure.

Continuing to FIG. 3, routine 300 for controlling pressure in a fuel tank, such as fuel tank 202 described above with reference to FIG. 2, is shown. Specifically, the routine determines a pressure in the fuel tank and adjusts a flow of cooling fluid from an air conditioner to a vapor cooler disposed in the vapor space of the fuel tank responsive to the fuel tank pressure. In this manner, fuel vapor in the fuel tank may be condensed and directed to an engine for combustion, thereby reducing pressure in the fuel tank.

At 302 of routine 300, it is determined if the engine is on. For example, it may be determined that the engine is on if the engine is spinning. If is it determined that the engine is not on, for example, if the hybrid vehicle is operating in a battery powered mode, the routine ends.

On the other hand, if it is determined that the engine is on or scheduled to run, routine 300 proceeds to 304 where it is determined if the fuel tank pressure is greater than a threshold pressure. As an example, during relatively warm ambient conditions, fuel vapor generation in the fuel tank may increase, thereby increasing the pressure in the fuel tank. In one example, the fuel tank pressure may be determined based on output from a pressure sensor disposed in the fuel tank. If it is determined that the fuel tank pressure is less than the threshold pressure, reduction of fuel tank pressure may not be desired, and the routine moves to 316 where current operation continues.

If, instead, it is determined that the fuel tank pressure is greater than the threshold pressure, the routine continues to 306 where it is determined if the air conditioner is on. In particular, it may be determined if the air conditioner compressor is on. As an example, it may be determined that the air conditioner is in operation if an operator of the vehicle has requested cool air to flow through vents in the passenger compartment of the vehicle. As another example, it may be determined that the air conditioner is on if cooling fluid is circulating through the air conditioner. If it is determined that the air conditioner is off, routine 300 moves to 318 where the air conditioner is turned on.

Once the air conditioner is on or if it is determined that the air conditioner is on, the routine proceeds to 308 where cooling fluid is directed from the air conditioner to the vapor cooler. In some examples, the system may include a valve disposed in the cooling fluid passage between the air conditioner and the vapor cooler. In such an example, cooling fluid may be directed from the air conditioner to the vapor cooler by adjusting the valve (e.g., opening the valve). By directing relatively cool cooling fluid from the air conditioner to the vapor cooler, fuel vapor inside the fuel tank may be cooled such that it condenses to form a condensate (e.g., condensed fuel vapor). Condensate that forms may be collected in the vapor cooler housing.

Thus, at 310 of routine 300, it is determined if the condensate level is greater than a threshold level. For example, a fluid level sensor may be disposed in the vapor cooler housing such that the condensate level may be determined. If it is determined that the condensate level is less than the threshold level, the routine waits until the condensate level is greater than the threshold level. Once it is determined that the condensate level is greater than the threshold level, routine 300 continues to 312 and the condensate is directed to the fuel pump or pressurized fuel line. Herein, routing condensed fuel vapor to the fuel pump or pressurized fuel line includes storing condensed fuel vapors in a liquid phase at the fuel pump and/or the pressurized fuel line. Specifically, condensate is pressurized and removed from the vapor cooler. Then, the condensed fuel vapors are stored in a liquid phase in the liquid fuel line, or fuel pump, or between the fuel pump and the engine injectors (that is, on the pressurized side or engine side of the fuel pump). For example, a feed pump may pump the condensate from the vapor cooler housing and direct the condensate along a condensate passage to the fuel pump and/or fuel lines. By directing the condensate to the fuel pump or lines, the fuel tank is bypassed, for example, and condensate is not drained to the fuel tank.

Once directed to the fuel pump, the condensate is delivered to the engine for combustion at 314 of routine 300. For example, the condensate may be routed to a fuel rail for injection to one or more cylinders of the engine via one or more fuel injectors. As another example, the fuel pump may deliver the condensate directly to one or more fuel injectors of the engine. In some examples, the condensate may be mixed with fuel from the fuel tank before injection to the cylinders of the engine. In other examples, the condensate may be delivered to cylinders of the engine without mixing with additional fuel from the fuel tank.

In this manner, fuel vapor in the fuel tank may be condensed such that the fuel tank pressure is reduced. By condensing the fuel vapor via the vapor cooler within the fuel tank, fuel vapor purging to a vapor canister may not need to be carried out, thereby reducing a possibility of over-filling the vapor canister and/or releasing hydrocarbons to the atmosphere.

FIG. 4 shows routine 400 for controlling cooling fluid flow to a vapor cooler disposed in a fuel tank, such as vapor cooler 222 disposed in fuel tank 202 described above with reference to FIG. 2, based on an engine temperature and or pressure. Specifically, the routine directs cooling fluid to the vapor cooler during an engine warm-up such that an engine warm-up time may be reduced. Further, cooling fluid flow to the vapor cooler is cut-off during conditions when an engine temperature is relatively high.

At 402 of routine 400, it is determined if the engine is warming up. As an example, it may be determined that the engine is warming up if an engine temperature is less than a threshold temperature and/or if an engine coolant temperature is less than a threshold temperature.

If it is determined that the engine is warming up, routine 400 proceeds to 404 where it is determined if the fuel tank temperature is greater than an engine coolant temperature (e.g., ECT). The fuel tank temperature may be determined based on a temperature sensor disposed in the fuel tank, for example. In some examples, the fuel tank temperature may be based on a temperature of the fuel stored in the fuel tank or a temperature of the vapor space above the fuel. The engine coolant temperature may be a temperature of engine cooling fluid, such as coolant, as it leaves the engine after it has circulated through the engine. If it is determined that the engine coolant temperature is greater than the fuel tank temperature, the routine moves to 410 and current operation is continued.

On the other hand, if it is determined that the fuel tank temperature is greater than the engine coolant temperature, routine 400 continues to 406 and cooling fluid is directed to the vapor cooler. In some examples, as described above, cooling fluid is directed to the vapor cooler from an air conditioner of a heating, ventilation, and air conditioning system. In other examples, the cooling fluid may be directed to the vapor cooler from another cooling system component. By directing cooling fluid with a temperature lower than that of the fuel tank to the vapor cooler, the heat exchange carried out in the vapor cooler may increase the temperature of the cooling fluid such that an engine warm-up time may be reduced, for example.

If it is determined that the engine is not warming up (e.g., the engine is already warmed-up) at 402, routine 400 moves to 408 and it is determined if the engine temperature is greater than a threshold temperature. The threshold temperature may be a temperature which the engine approaches before the engine overheats, for example. As an example, the engine temperature may be greater than the threshold temperature during a towing mode of operation when the vehicle is towing a load, and increased engine heat rejection is desired. If the engine temperature is less than the threshold temperature, current operation continues at 410.

On the other hand, if it is determined that the engine temperature is greater than the threshold temperature, the routine continues to 412 where the vapor cooler is bypassed even if the fuel tank pressure is greater than a threshold pressure. When cooling fluid is routed to the vapor cooler under relatively high fuel tank pressure conditions, the cooling fluid may be heated such that the fuel vapor is cooled, thereby reducing the fuel tank pressure. However, when increased engine heat rejection is desired, such as during a towing mode of operation, the vapor cooler may be bypassed such that cooling fluid does not flow to the vapor cooler and the cooling fluid temperature is not increased due to the vapor cooler heat rejection. In this manner, a possibility of engine overheat may be reduced, for example.

Thus, cooling fluid flow to the vapor cooler may be adjusted based on the fuel tank temperature and the engine temperature. For example, when the engine temperature is relatively low and the fuel tank temperature is relatively high, cooling fluid may be directed to the vapor cooler such that the cooling fluid may be warmed, even if a decrease in fuel tank pressure is not desired. In this way, the engine warm-up may occur over a shorter duration. Further, under conditions when the engine temperature is relatively high and cooling fluid is flowing through the vapor cooler, cooling fluid flow to the vapor cooler may be shut-off such that maximum engine heat rejection may be obtained.

FIG. 5 shows routine 500 for controlling a radiator fan, such as radiator fan 92 described above with reference to FIG. 1, based on a fuel tank temperature. Specifically, the routine determines the fuel tank temperature and adjusts the radiator fan speed accordingly when cooling fluid is flowing through a vapor cooler disposed in a vapor space of the fuel tank.

At 502 of routine 500, a temperature of the fuel tank is determined. The fuel tank temperature may be determined based on output from a sensor disposed in the fuel tank, for example. In some examples, the fuel tank temperature may be based on a temperature of the fuel stored in the fuel tank or a temperature of the vapor space above the fuel.

Once the fuel tank temperature is determined, routine 500 proceeds to 504 where it is determined if cooling fluid is flowing to the vapor cooler. As an example, it may be determined that cooling fluid is flowing to the vapor cooler if a cooling fluid flow rate or velocity through the vapor cooler is greater than a threshold. As another example, it may be determined that cooling fluid is flowing to the vapor cooler if a valve disposed between the vapor cooler and an air conditioner is open such that cooling fluid may flow to the vapor cooler from the air conditioner. If it is determined that cooling fluid is not flowing through the vapor cooler, the routine moves to 512 and current operation is continued.

On the other hand, if it is determined that cooling fluid is flowing to the vapor cooler, routine 500 continues to 506 where it is determined if the fuel tank temperature is greater than a threshold temperature. The threshold temperature may be based on the heat exchange with the vapor cooler, for example. If the fuel tank temperature is less than the threshold temperature, the routine moves to 512 and current operation is continued.

If, instead, it is determined that the fuel tank temperature is greater the threshold temperature, the routine proceeds to 508 where it is determined if the radiator fan is on. It may be determined that the radiator fan is operating if the radiator fan is spinning, for example. If the radiator fan is not on, routine 500 moves to 514 and the radiator fan is turned on. Once it is determined that the radiator fan is on or once the radiator fan is turned on, routine 500 continues to 510 where the radiator fan speed is adjusted based on the fuel tank temperature. As an example, when the fuel tank temperature is much greater than the threshold temperature, the radiator fan speed may be increased to a higher speed or turned on to a relatively high speed such that greater cooling may occur. In contrast, if the fuel tank temperature is only slightly above the threshold temperature, the radiator fan speed may be reduced or turned on to a relatively low speed such the cooling system is cooled as desired.

In this way, the cooling system temperature may be regulated. For example, when cooling fluid is flowing through the vapor cooler and heat is rejected to the cooling fluid via the vapor cooler, the radiator fan may be adjusted such that the cooling system remains in a desired temperature range.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for a fuel system, comprising:
   in a first mode, if an engine is on and the engine is warming-up, and responsive to a fuel tank temperature being greater than an engine coolant temperature,
      condensing fuel vapor in a vapor cooler by routing cooling fluid to the vapor cooler disposed in a fuel tank, and
      routing condensed fuel vapor to a fuel pump or a pressurized fuel line; and
   during a second mode in which the engine is off and in which the fuel tank is sealed, condensing fuel vapor in the vapor cooler disposed in the fuel tank.

2. The method of claim 1, wherein the cooling fluid routed to the vapor cooler is cooling fluid from an air conditioner.

3. The method of claim 1, further comprising operating a vehicle by a battery at a same time that the engine is off during the second mode and pumping the condensed fuel vapor to the fuel tank.

4. The method of claim 1, wherein, during the first mode, the condensed fuel vapor is routed to the fuel pump via a feed pump or a fuel line, and from the fuel pump or the fuel line, the condensed fuel vapor is routed to a fuel rail or an injector, and wherein routing the condensed fuel vapor to the fuel pump or the fuel line bypasses the fuel tank.

5. The method of claim 1, further comprising, during the first mode, delivering the condensed fuel vapor and fuel to the engine for combustion via the fuel pump or the fuel line.

6. The method of claim 1, further comprising, during the first mode, condensing fuel vapor responsive to an ambient temperature greater than a threshold temperature.

7. The method of claim 1, further comprising, during the first mode, pumping the condensed fuel vapor via a feed pump directly to the fuel pump or the fuel line when a condensed fuel vapor level is greater than a threshold level.

8. The method of claim 1, wherein routing the condensed fuel vapor to the fuel pump or the pressurized fuel line in the first mode includes storing condensed fuel vapors in a liquid phase at the fuel pump or the pressurized fuel line.

9. The method of claim 1, further comprising during the first mode, if the fuel tank temperature is greater than a threshold temperature and the cooling fluid is already flowing to the vapor cooler, where the vapor cooler includes a housing for collecting condensed fuel vapor, turning on a radiator fan.

10. A fuel system method, comprising:
    while operating a vehicle with an engine off and a fuel tank sealed,
       condensing fuel vapor in a vapor cooler disposed in the fuel tank; and while the engine is on,
    responsive to fuel tank pressure greater than a threshold pressure, turning on an air conditioner, routing cooling fluid from the air conditioner to the vapor cooler disposed in the fuel tank, condensing fuel vapor in the vapor cooler by routing the cooling fluid to the vapor cooler disposed in the fuel tank, and circulating the cooling fluid through the engine, wherein the vapor cooler is in fluid communication with the air conditioner and a cooling system of the engine, and
    responsive to an engine temperature greater than a threshold temperature, bypassing the cooling fluid from the vapor cooler even if the fuel tank pressure is greater than the threshold pressure, initiating feed pump operation responsive to a condensate level in the vapor cooler, and routing condensate to the fuel pump or to a fuel line via a feed pump, and delivering the condensate to the engine via the fuel pump or the fuel line.

11. The method of claim 10, further comprising, injecting the fuel vapor that was condensed in the vapor cooler while operating the vehicle with the engine off into a fuel pump as soon as the engine starts.

12. The method of claim 10, wherein the air conditioner is part of the cooling system which further includes a radiator with a radiator fan, and further comprising adjusting a speed of the radiator fan responsive to a temperature of the fuel tank greater than a threshold fuel tank temperature.

13. The method of claim 10, wherein routing the condensate to the fuel pump or the fuel line via the feed pump includes bypassing the fuel tank.

14. A fuel system for a vehicle, comprising:
    an engine;
    a fuel tank with a fuel pump;
    a vapor cooler disposed within the fuel tank, the vapor cooler in fluid communication with an air conditioner of a cooling system or other auxiliary cooling device;
    a pressure sensor coupled within the fuel tank and configured to estimate a fuel tank pressure; and
    a control system with computer readable instructions for:

in a first mode, turning on the air conditioner and routing cooling fluid from the air conditioner to the vapor cooler responsive to the fuel tank pressure greater than a threshold pressure to condense fuel vapor in the vapor cooler by routing cooling fluid to the vapor cooler disposed in the fuel tank, and circulating cooling fluid through the engine, wherein the vapor cooler is in fluid communication with the air conditioner and the cooling system;

in a second mode, responsive to an engine temperature greater than a threshold temperature, bypassing the cooling fluid from the vapor cooler even if fuel tank pressure is greater than the threshold pressure, and routing condensate from the vapor cooler to the fuel pump; and in a third mode, where the engine is off and where the fuel tank is sealed, condensing fuel vapor in the vapor cooler disposed in the fuel tank.

15. The fuel system of claim 14, further comprising a temperature sensor configured to estimate a fuel tank temperature, and instructions for, during the first mode and the second mode, routing the cooling fluid to the vapor cooler when the fuel tank temperature is greater than a threshold fuel tank temperature during an engine warm-up.

16. The fuel system of claim 14, wherein the vapor cooler is in fluid communication with the air conditioner for a passenger compartment.

17. The fuel system of claim 14, further comprising instructions for, during the first and second modes, routing the condensate from the fuel pump to a fuel rail for delivery to the engine for combustion.

18. The method of claim 2, wherein the air conditioner is coupled to the vapor cooler via a cooling fluid line.

19. The method of claim 14, wherein a vehicle is operated during the third mode.

* * * * *